US008419024B1

(12) United States Patent
Arroyo-Ferrer

(10) Patent No.: US 8,419,024 B1
(45) Date of Patent: Apr. 16, 2013

(54) CLEANING CART

(76) Inventor: Fernando Arroyo-Ferrer, Mayaguez, PR (US)

(*) Notice: Subject to any disclaimer, the term of this patent is extended or adjusted under 35 U.S.C. 154(b) by 197 days.

(21) Appl. No.: 12/857,006

(22) Filed: Aug. 16, 2010

Related U.S. Application Data

(60) Provisional application No. 61/234,010, filed on Aug. 14, 2009.

(51) Int. Cl.
*B62B 3/00* (2006.01)
(52) U.S. Cl.
USPC ............... 280/47.35; 280/79.2; 280/79.3
(58) Field of Classification Search ............ 280/47.34, 280/47.35, 47.371, 79.11, 79.5, 79.2, 79.3; D34/1, 5, 7, 12, 14, 17, 19, 20, 21
See application file for complete search history.

(56) References Cited

U.S. PATENT DOCUMENTS

| 3,276,600 | A | * | 10/1966 | Black et al. ............... 211/85.19 |
| 4,869,518 | A | * | 9/1989 | Breveglierij et al. ....... 280/47.35 |
| 5,326,117 | A | * | 7/1994 | Cook ........................... 280/79.2 |
| D481,188 | S | | 10/2003 | DiGiacomo, Jr. et al. |
| 6,827,357 | B2 | * | 12/2004 | Calmeise et al. .......... 280/47.34 |
| 6,860,494 | B1 | * | 3/2005 | Chisholm .................. 280/47.35 |
| D533,705 | S | | 12/2006 | Bertucci et al. |
| 7,240,910 | B2 | * | 7/2007 | Stuemke ..................... 280/79.5 |
| D556,418 | S | * | 11/2007 | Zorzo ............................. D34/21 |
| 7,296,808 | B2 | * | 11/2007 | Huguet ...................... 280/47.34 |
| 7,455,246 | B2 | * | 11/2008 | Roth et al. ..................... 239/146 |
| 7,467,801 | B1 | | 12/2008 | Garduno |
| D594,170 | S | | 6/2009 | Catron |
| D600,872 | S | | 9/2009 | Phillips |
| D607,172 | S | | 12/2009 | Catron |
| 7,648,147 | B2 | * | 1/2010 | Lauer et al. ............... 280/47.35 |
| 2002/0109318 | A1 | | 8/2002 | Calmeise et al. |
| 2003/0122331 | A1 | | 7/2003 | DiGiacomo, Jr. et al. |
| 2004/0245734 | A1 | | 12/2004 | Thomas |
| 2006/0232033 | A1 | | 10/2006 | Pint |
| 2007/0267832 | A1 | | 11/2007 | Denissov |
| 2007/0289788 | A1 | | 12/2007 | Salmon |
| 2008/0029981 | A1 | | 2/2008 | Dukes |
| 2008/0295870 | A1 | * | 12/2008 | Perelli et al. ................... 134/42 |
| 2009/0026732 | A1 | | 1/2009 | Lindner et al. |
| 2009/0189498 | A1 | * | 7/2009 | Catron et al. ............. 312/249.8 |

FOREIGN PATENT DOCUMENTS

FR 2833913 A1 * 6/2003
GB 2388577 A * 11/2003

OTHER PUBLICATIONS

9T75 High Security Janitor Cart, Rubbermaid; http://www.rubbermaidcommercialproducts.com/c5/c13/9T75-High-Security-Janitor-Cart-p1127.html.

* cited by examiner

*Primary Examiner* — John Walters
(74) *Attorney, Agent, or Firm* — Hoglund & Pamias, PSC; Roberto J. Rios

(57) ABSTRACT

The cleaning cart of the invention is a new kind of cleaning cart providing several utilities and designed to provide an efficient and organized solution. The cleaning cart is completely covered preventing People from seeing dirty mops, buckets, dirty wipes or cleaning products. The cleaning cart also has a removable waste container that can be easily separated from the rest of the cleaning cart. The cleaning cart also works as an advertising cart. The cleaning cart provides a new way of cleaning in a more organized, clean and healthier way.

96 Claims, 16 Drawing Sheets

-Prior Art-

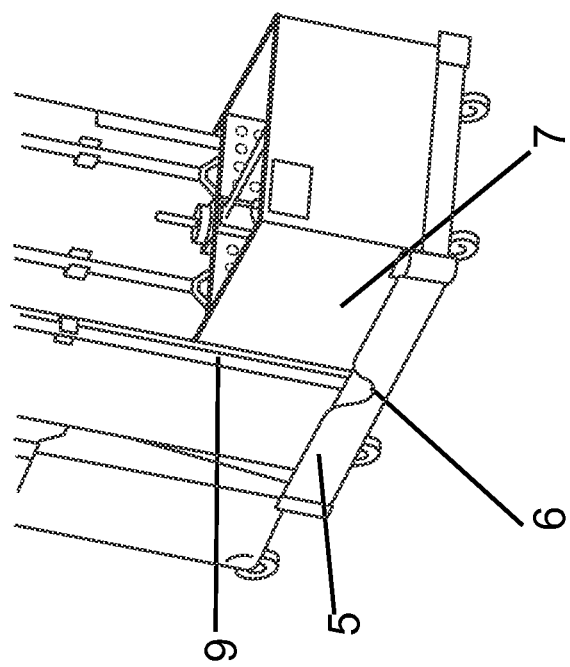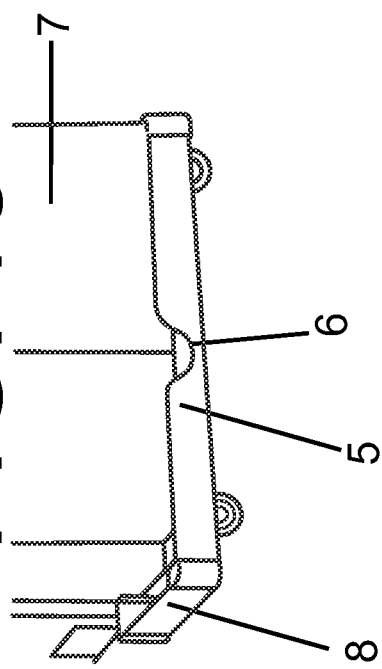

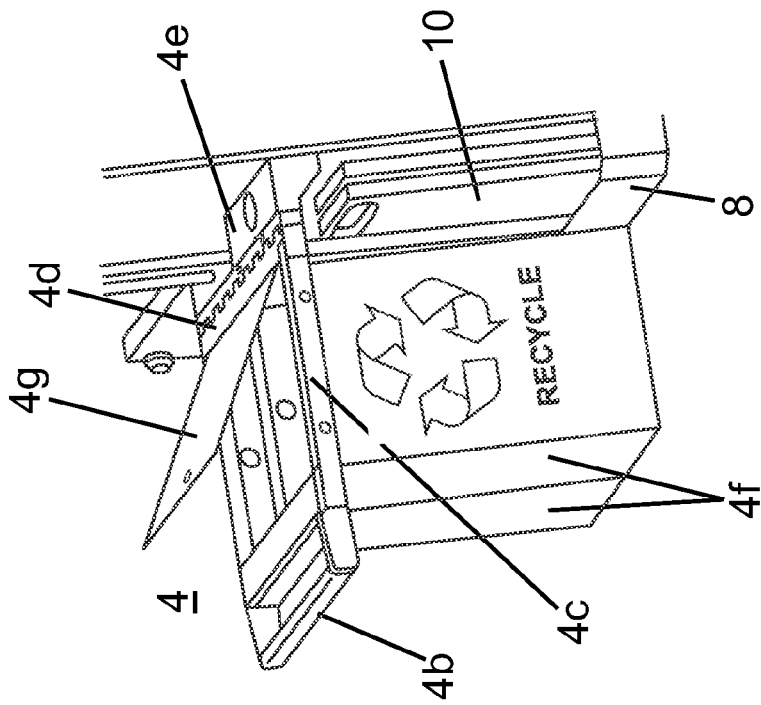
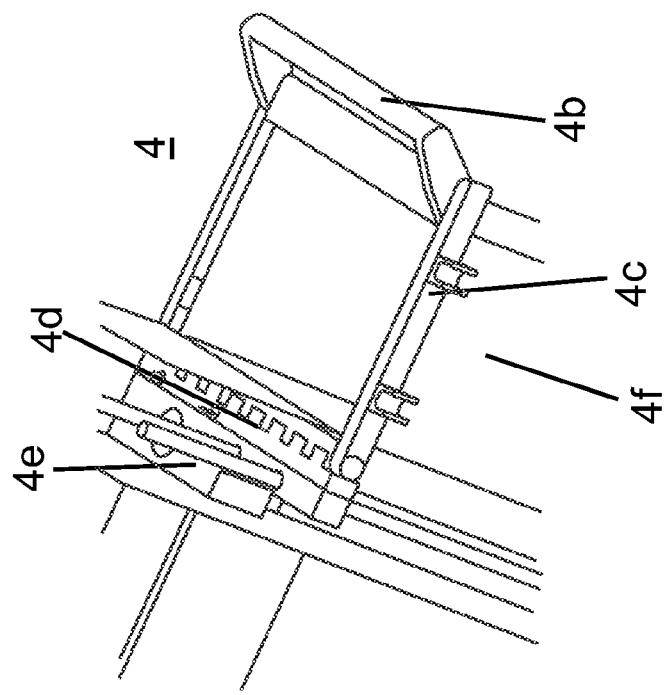

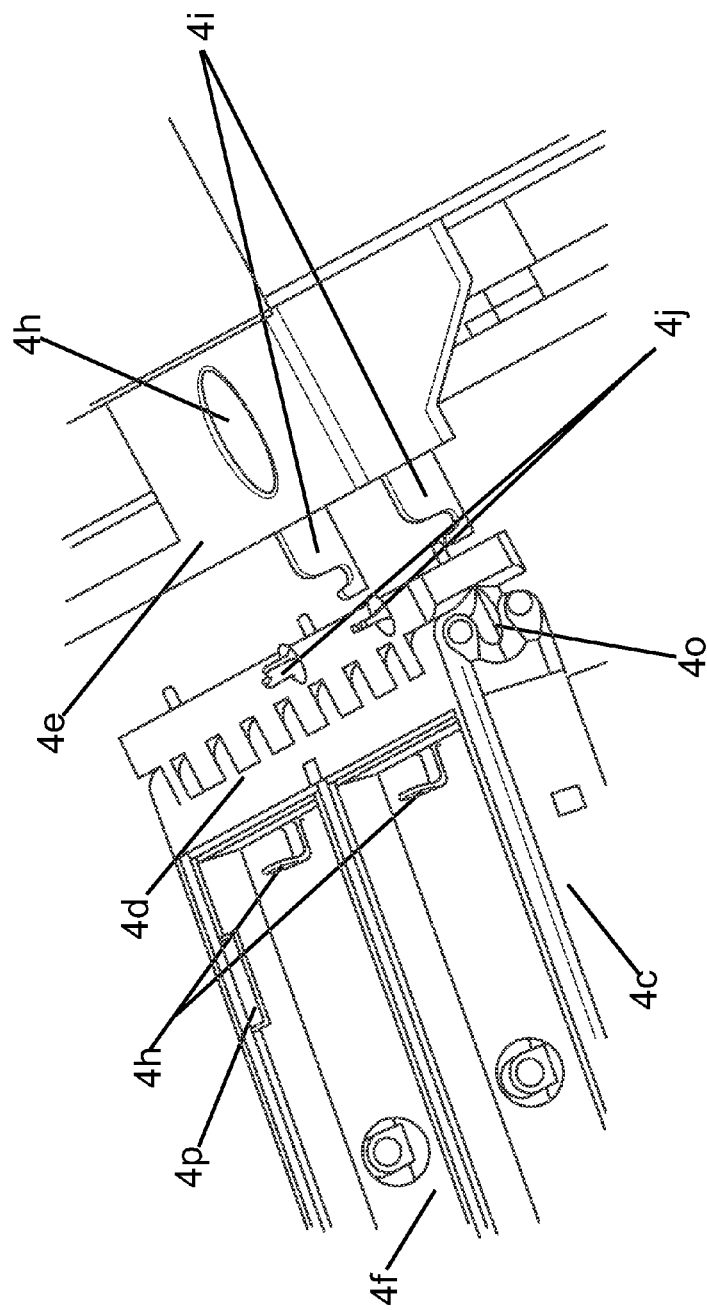

CLEANING CART

FIELD OF THE INVENTION

The present invention relates to a cleaning cart. Specifically, the invention is directed to a cleaning cart that helps a user carry out cleaning tasks in a fast and organized manner. More specifically, the cleaning cart of the invention is a cart full of utilities and designed to perform a very highly organized work.

BACKGROUND OF THE INVENTION

The cleaning and maintenance industry always work following several cleaning codes and strict standards. One example would be a custodian assigned to an operation room that has to periodically replace the cleaning water after washing a mop to avoid contamination. There are other codes and standards that the cleaning industry needs to comply with in order to provide a secure and sterile service. Several companies providing cleaning services utilize a cleaning cart as its main piece of work. A lot of these companies usually have very messy and unorganized cleaning carts creating an awkward and unpleasant situation not only for the cleaning company but also for a contracting company or entity. This is a major problem in hospitals, airports, malls, or places where there are people constantly walking around the working or cleaning areas.

The present invention provides a solution for this problem by providing a cleaning cart that will expedite cleaning tasks in an organized manner, while providing a clean and covered cart.

SUMMARY OF THE INVENTION

The cleaning cart according to an aspect of the invention is a new kind of cleaning cart providing several utilities and designed to provide an efficient and organized solution.

According to an aspect of the invention, the cleaning cart is completely covered preventing people to see dirty mops, buckets, dirty wipes or cleaning products since everything is going to be inside the cleaning cart.

According to another aspect of the invention, the cleaning cart provides a specific area or spot to accommodate everything needed while performing cleaning tasks. The cleaning cart will hold the mops while they dry, have storage for the refills of all products such as: sanitary papers, soaps, cleaning products, the wipes, the gloves, the documents, the caddies and anything else a custodian uses.

According to a further aspect of the invention, the cleaning cart serves as an advertising cart. It has a constant smooth surface capable of being used for advertising, all around the cart when the cart is completely closed or during movement.

According to an aspect of the invention, the cleaning cart is an enclosed unit made of plastic.

According to another aspect of the invention, the cleaning cart has a portable canister containing a germicide solution that kills bacteria while a toilet brush is placed on the canister. The canister further has a seal lock, also known as "Twist 'N Lock", which helps avoid spills or leaks.

According to a still further aspect of the invention, the cleaning cart allows a user to use buckets with their own wheels while on the cart. This is important since when the refill time comes, the user will be able to transport the full-filled bucket without having to use extra strength to carry it. A detent element is also provided to latch the bucket inside the cart while in movement.

According to an aspect of the invention, a portable double caddy labeled by task is provided allowing the independency of one cleaning task from another.

According to another aspect of the invention, the cleaning cart has compartments provided to keep hygienic papers out of contamination risk with the cleaning products and other substances that can cause allergic reactions to the users of the toilet tissue and towel paper.

According to another aspect of the invention, the cleaning cart has a metal squared-shaped rod that fits a plastic liner into a waste bag avoid the use of oversized plastic liners.

According a further aspect of the invention, the cleaning cart has dust and microfiber pockets storing and maintaining dust enclosed in one location.

According to an aspect of the invention, the cleaning cart has a removable wheeled container that can be moved separately from the rest of the cart. A quick-release mechanism is provided allowing separating the container from the cart to use it as an individual wheeled waste container.

According to an aspect of the invention, the cleaning cart allows collecting regular trash on one bag and recycled material on another separate bag.

According to an aspect of the invention, the cleaning cart provides mops hanging drying areas allowing an accelerated drying process for 2 different task mops while avoiding cross contamination. A mop is used for common areas and another mop is used for the restroom.

According to another aspect of the invention, the cleaning cart has a storage area for keeping important documents in a secure, clean and accessible place. Furthermore, the cleaning cart has a combination lock system to eliminate the problems associated with lost keys.

BRIEF DESCRIPTION OF THE DRAWINGS

These and other aspects and advantages of the present invention are more apparent from the following detailed description and claims, particularly when considered in conjunction with the accompanying drawings, in which:

FIG. 15 shows a dust and microfiber pocket arrangement according to the present invention.

FIG. 16 shows another view of the dust and microfiber pocket arrangement of FIG. 15 according to the present invention.

FIG. 17 shows the removable wheeled container of the cleaning cart according to the present invention.

FIG. 18 shows another view of the removable wheeled container of the cleaning cart according to the present invention.

FIG. 19 shows the quick-release arrangement between the removable wheeled container and the cleaning cart according to the present invention.

DETAILED DESCRIPTION OF THE INVENTION

Figure 1:
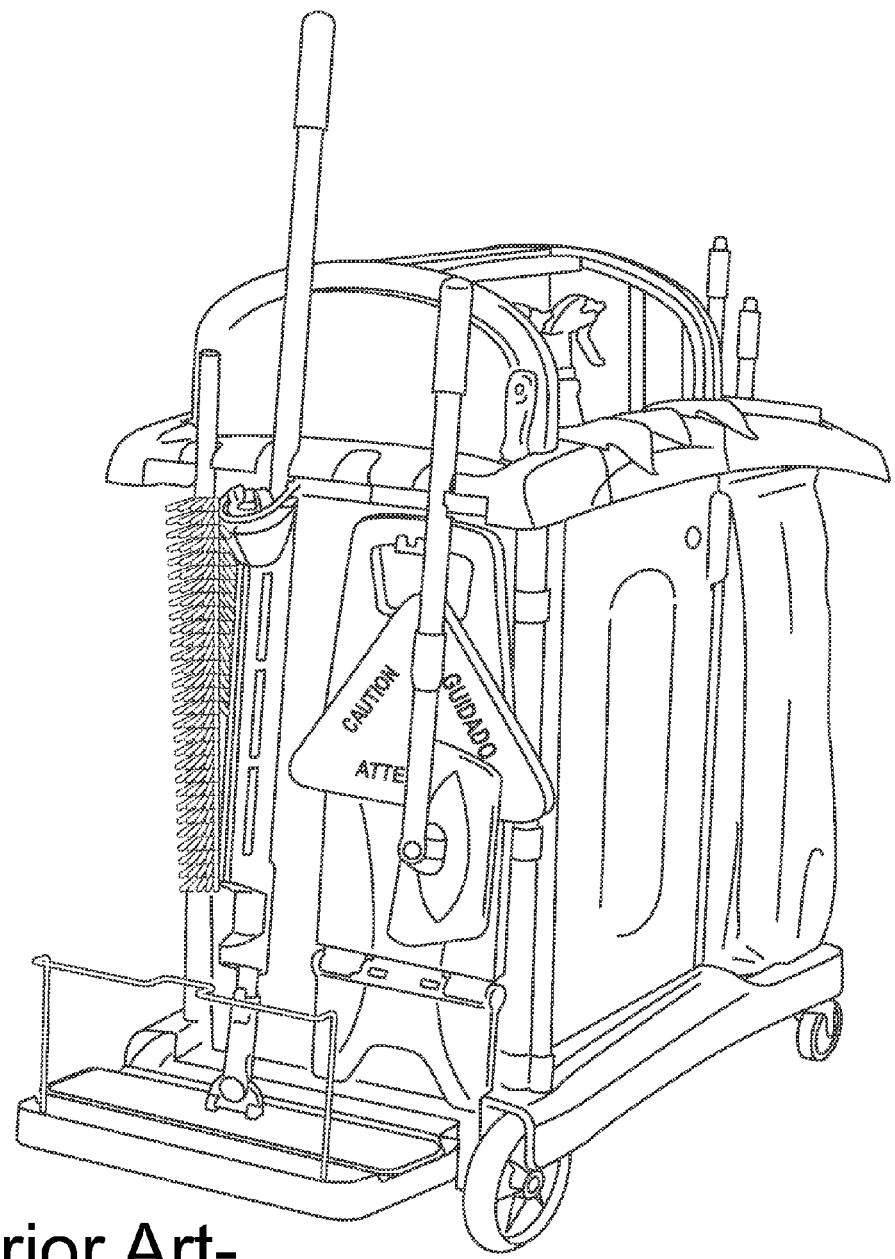
FIG. 1 shows a cleaning cart according to the prior art.
Figure 2:
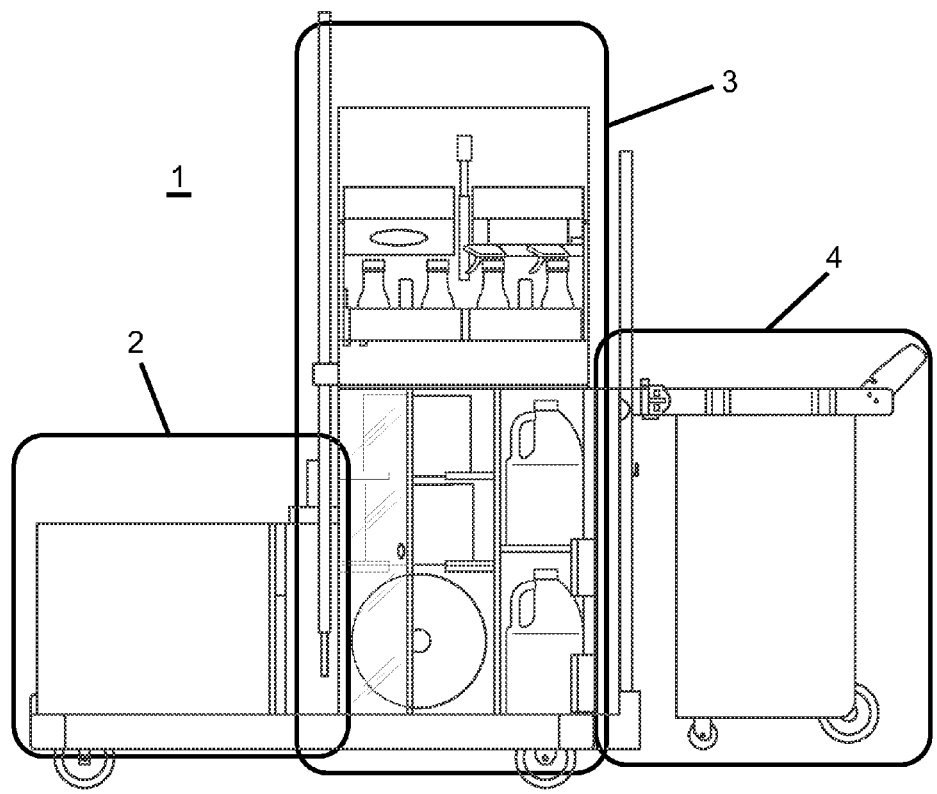
FIG. 2 shows a front view of the cleaning cart of the present invention.

FIG. 1 shows one cleaning cart of the prior art. As can be seen, this cart while provides a mobile solution for transporting equipment and cleaning materials it fails to provide an arrangement for separating materials, equipment and trash collection in a sterile and organized manner. In contrast, FIG. 2 shows a cleaning cart 1 of the present invention comprising a moping section 2, a storage section 3 and a trash collecting section 4.

Figure 4:
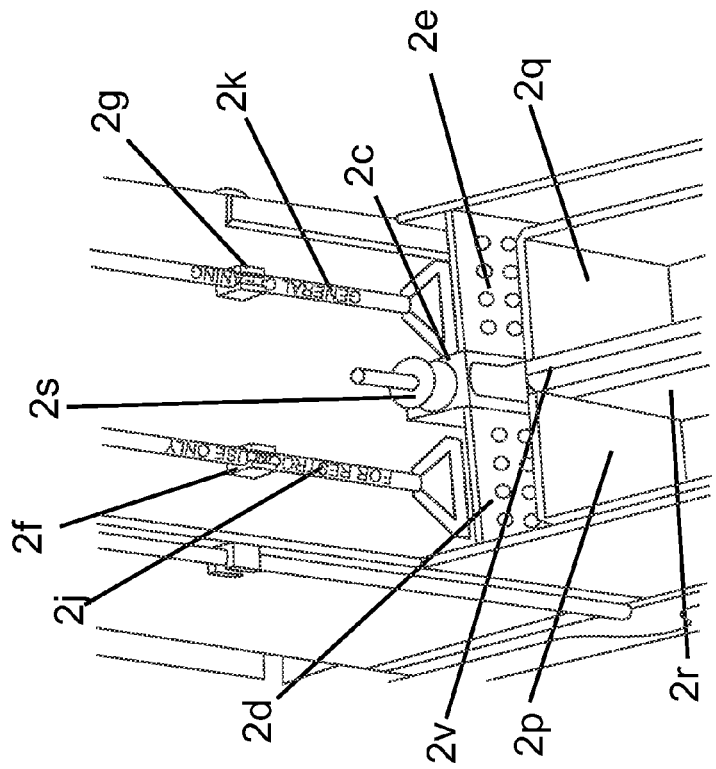
FIG. 4 shows a mop drying area according to the present invention.
Figure 3:
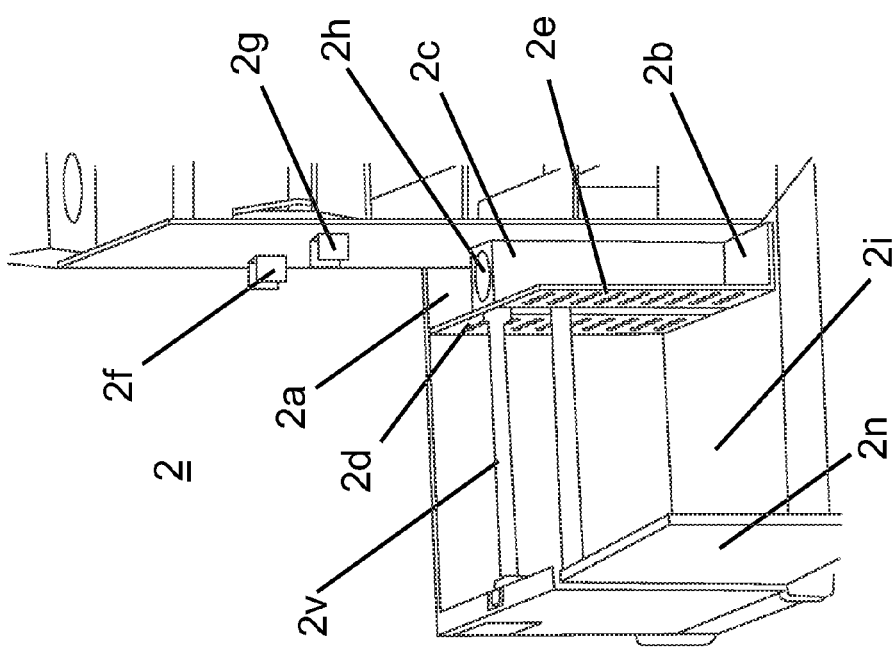
FIG. 3 shows a mop receiving area according to the present invention.
Figure 6:
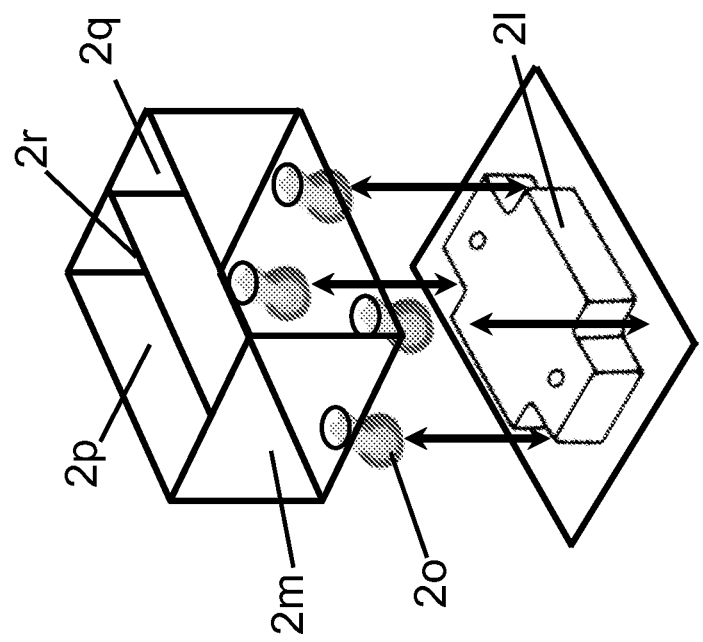
FIG. 6 shows a mop bucket detent arrangement according to the present invention.
Figure 7:
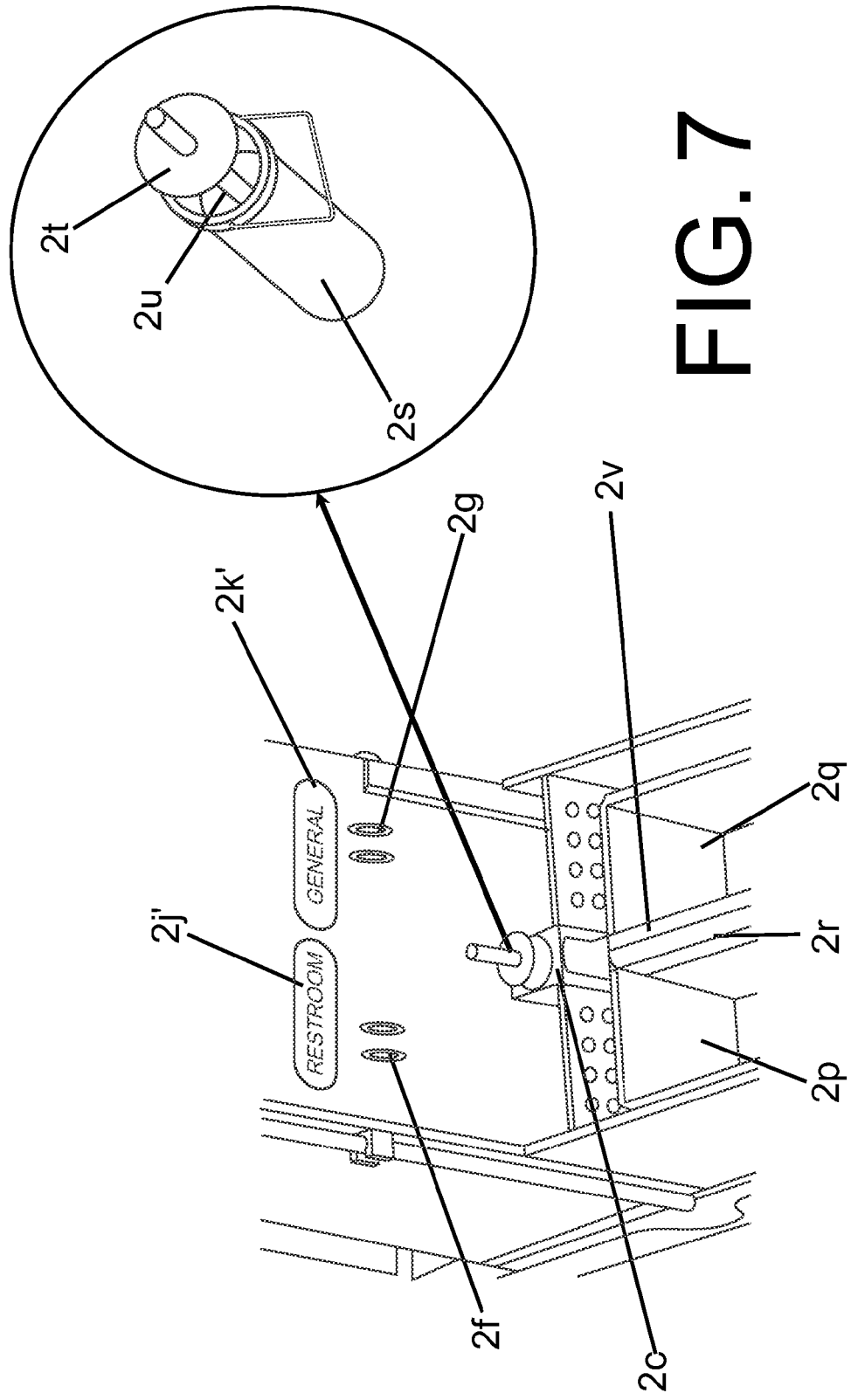
FIG. 7 shows a toilet brush container arrangement according to the present invention.

The moping section 2 will be described in accordance to FIGS. 3-7. Specifically, moping section 1 includes a moping cart receiving area 2i for receiving a moping cart 2m. The moping cart receiving area 2i is defined as an enclosed area provided with an access door 2n that keeps the moping cart 2m inside the moping cart receiving area 2i as shown in FIG. 3. One side of the receiving area 2i is provided with two separate walls 2d and 2e having a plurality of distributed holes as show in FIGS. 3 and 4. In addition, a holding element 2v is provided to removably receive at least on mop wringer (not shown) to be used in conjunction with a moping cart 2m. Another view of the moping section 2 is shown in FIG. 4, illustrating a mop receiving area defined by two separate mop sections 2a and 2b divided by a separating element 2c. This dual-mop arrangement is provided to avoid cross-contamination between common areas and restroom areas. Specifically, a first mop 2j is provided for mopping restroom areas and a separate mop 2k is provided for general mopping tasks. Visual indicia is provided on mop 2j and mop 2k to indicate which mop must be used for restrooms and which mop must be used for general mopping, respectively. In addition, matching indicia 2j' and 2k' is provided on the mop receiving area to indicate correct mop placement as shown in FIG. 7. One important feature of the present invention is that it provides for the accelerated drying of both task mops by virtue of having walls 2d and 2e with a plurality of holes that allow the unrestricted flow of air to dry the mop fibers when the mops are positioned in the mop receiving area as shown in FIG. 4. Latching elements 2f and 2g are provided to prevent the mops from falling out of the cleaning cart 1 and to latch the mops in place against the cleaning cart preventing the mop fibers to come in contact with the flooring section of said mop receiving area. This further eliminates cross-contamination and ensures compliance with health and sanitary standards.

As previously explained, the mop receiving area as defined by the two separate mop sections 2a and 2b is divided by the separating element 2c. Moreover, this separating element 2c comprises a receiving opening 2h configured to removably receive a toilet brush container 2s as best illustrated in FIGS. 4 and 7. The toilet brush container 2s is preferably shaped to mate with the shape of said receiving opening 2h and comprises a removable lid 2t having a toilet brush integrated. A handle is also provided to easily pull the toilet brush container 2s out of the receiving opening 2h. The container is preferably filled with sanitizing fluid to maintain the brush bristles sanitized when not in use. The removable lid 2t and the brush container 2s are provided with a mating sealing arrangement to avoid spillage of said sanitizing fluid. In a preferred embodiment, the sealing arrangement is a "twist n' lock" sealing arrangement. However, other sealing arrangements can be used as long as it prevents spillage of said sanitizing fluid.

Figure 5:
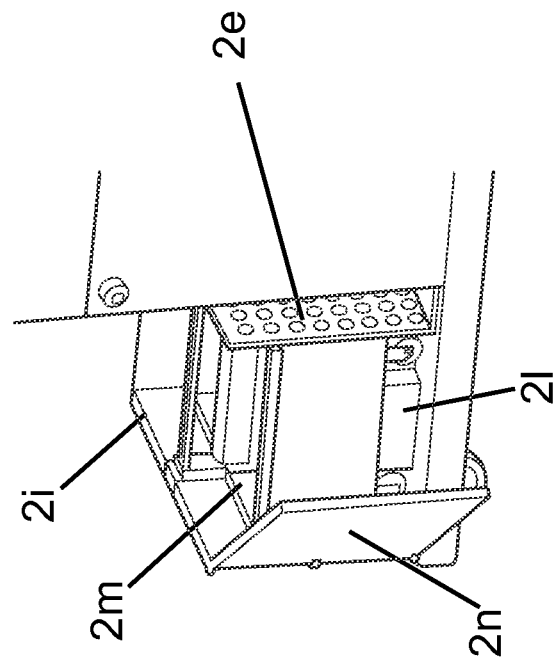
FIG. 5 shows another view of the mop receiving area according to the present invention.

To further prevent cross-contamination between mops 2j and 2k, a portable dual moping cart 2m is provided in conjunction with the cleaning cart 1 of the present invention. As best illustrated in FIGS. 4 and 5, the moping cart 2m comprises a first area 2p for receiving a first mop 2j and a second area 2q for receiving a second mop 2k separated by a dividing wall 2r. As previously explained, the holding element 2v is provided to removably receive at least on mop wringer (not shown) to be used in conjunction with the moping cart 2m. One important feature of the invention is that it is designed to removably maintain the moping cart 2m in place while the cleaning cart 1 is moving. This is achieved primarily by enclosing the moping cart 2m inside the moping cart receiving area 2i with door 2n. In addition, a detent element 2l is provided to engage the moping cart and prevent its movement as shown in FIGS. 5 and 6. Specifically, the detent element 2l has a cross shape having receiving portions on its corners for receiving each of the moping cart's wheels 2o as shown in FIG. 6. Thus, when an area needs to mopped, a person simply pulls the moping cart 2m out of the moping cart receiving area 2i and once the task is performed the person places the moping cart 2m inside the moping cart receiving area 2i again making sure all the wheels 2o are mated inside each corner of the detent element 2l and proceeds to close the door 2n. This arrangement prevents said moping cart 2m from moving or falling out of the cleaning cart 1 even when the door 2n is opened.

Figure 9:
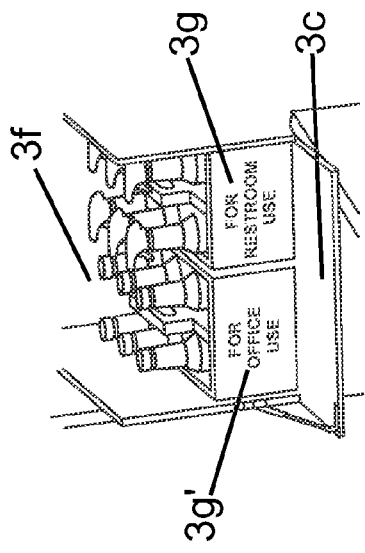
FIG. 9 shows a portable double-caddy arrangement according to the present invention.
Figure 10:
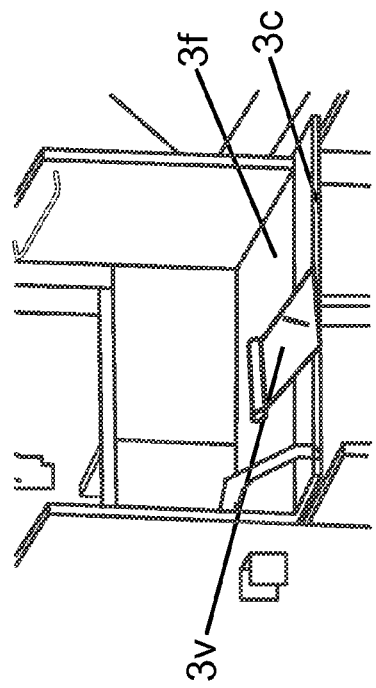
FIG. 10 shows a movable door/table arrangement according to the present invention.
Figure 8:
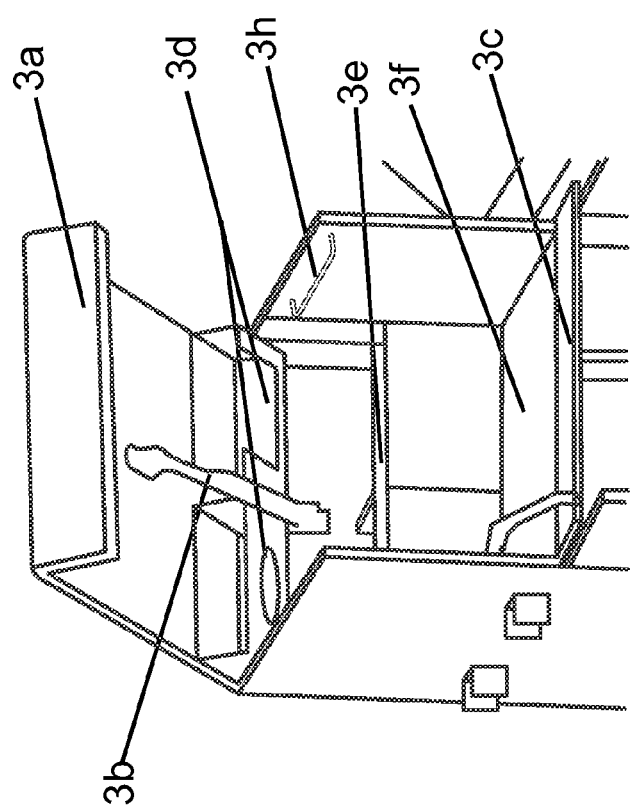
FIG. 8 shows a storage area of the cleaning cart according to the present invention.
Figure 11:
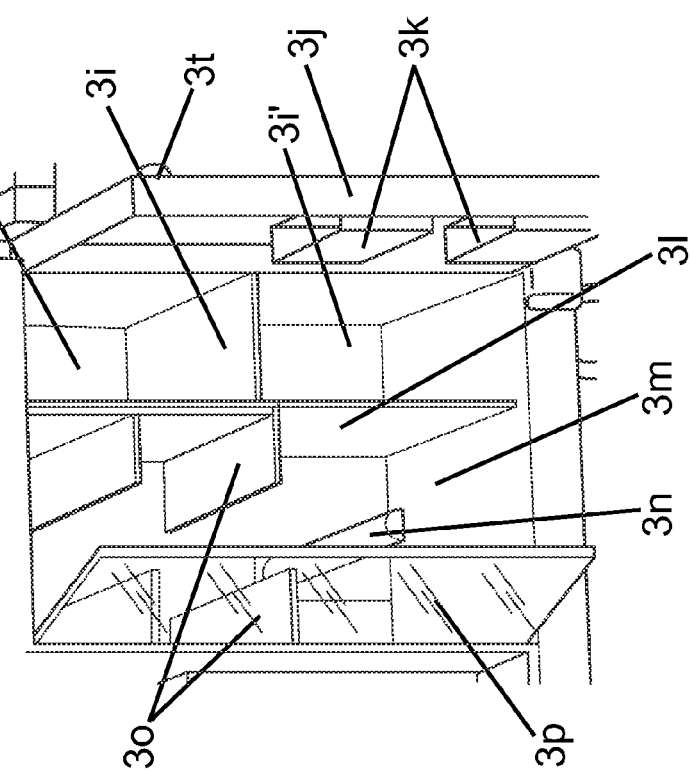
FIG. 11 shows another storage area of the cleaning cart according to the present invention.

The storage section 3 of the present invention is defined by an upper storage portion and a lower storage portion as shown in FIGS. 8 and 11, respectively. The upper storage portion comprises a first storage area 3f enclosed by sidewalls, a second back storage area 3e, a front door 3c and an upper door 3a. The second back storage area 3e comprises a plurality of divided areas configured to store cleaning materials such as but not limited to: plastic liners and trash bags. FIG. 8 shows the upper door 3a comprising a plurality of storage boxes 3d attached to its lower surface for storing and dispensing cleaning wipes and disposable sterile gloves. Moreover, the upper door 3a comprises a retarding opening element 3b that facilitates opening and closing said upper door 3a in a semi-automatic manner. The front door 3c further comprises a latching element for maintaining said front door 3c in a fix open position as shown in FIGS. 8-10. One important feature of the present invention is that the first storage area 3f is designed to receive a dual caddy 3g, 3g' configured to separately carry office and restrooms cleaning supplies as shown in FIG. 9. This dual arrangement further ensures preventing cross contamination between office and restrooms supplies. Another important feature of the present invention is that the latching element of the front door 3c is configured to maintain said front door 3c in a substantially horizontal position cooperating with a bottom portion of said first storage area 3f to serve as a table/desk for receiving for example a notepad 3v as shown in FIG. 10. A towel hanger 3h is also provided to facilitate storage and easy access of a towel.

Figure 12:
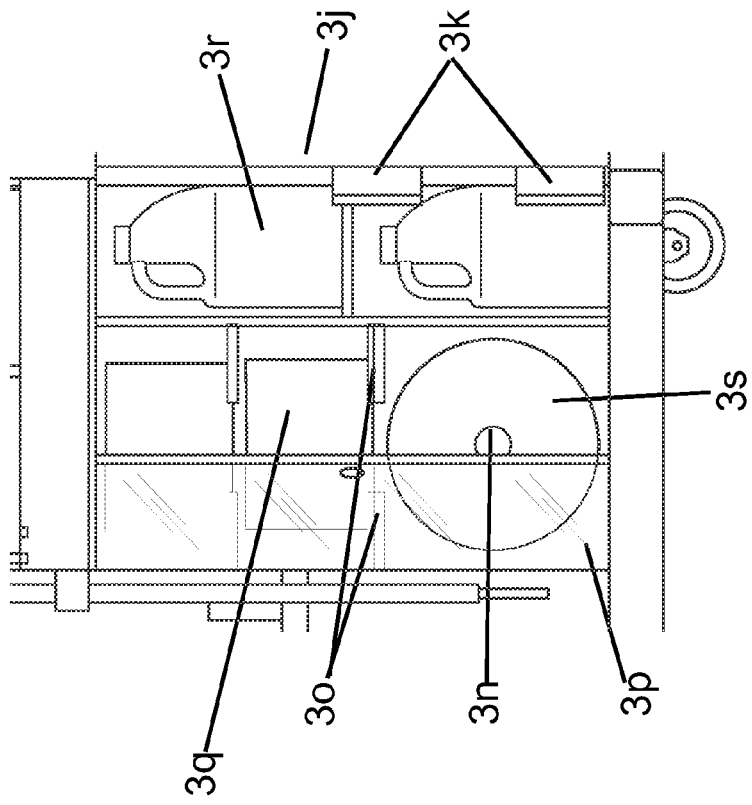
FIG. 12 shows the storage area of FIG. 11 with cleaning materials according to the present invention.
Figure 14:
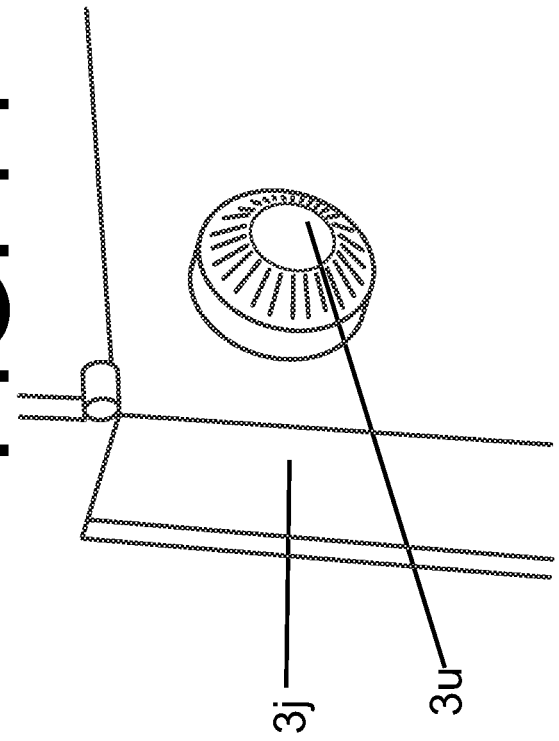
FIG. 14 shows a door lock arrangement of the door arrangement of FIG. 13 according to the present invention.
Figure 13:
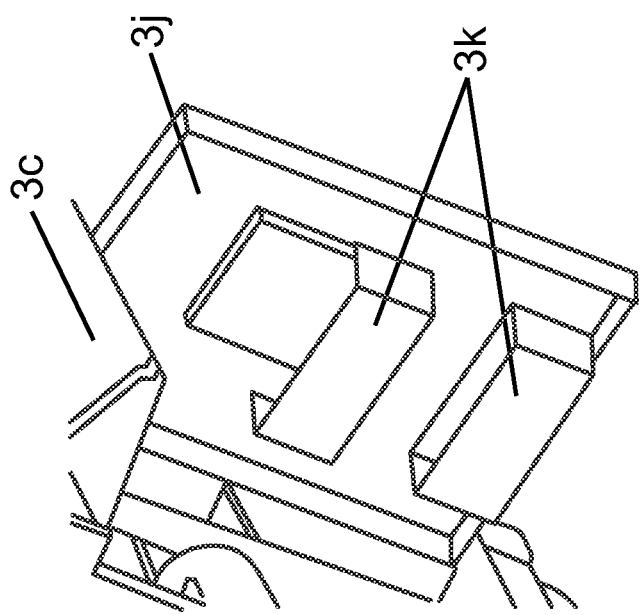
FIG. 13 shows a door arrangement of the storage area of FIG. 11 with cleaning materials according to the present invention.

FIGS. 11-13 illustrate the lower storage portion of said storage section 3 comprising two side-by-side storage areas divided by a partition wall 3l. A left-side storage area is defined by a lower section 3m including an insertion element 3n configured to receive a toilet paper roll 3s as shown in FIG. 12. The insertion element 3n perpendicularly extends at an angle with respect to a back wall of the lower section 3m to prevent said toilet paper roll 3s from falling or slipping out of the lower section 3m. It is important to point out that the position and dimensions of said insertion element 3n with respect to said back wall and the dimensions of the lower section 3m are selected based on the size of said toilet paper roll 3s. There are also provided a plurality of paired shelves 3o configured to receive at least one towel paper roll 3q as shown in FIG. 12. These shelves are also positioned at a matching angle with respect the each other and the back wall to prevent said towel paper roll 3q from falling or slipping out of the shelves. A door 3p is provided to isolate and keep hygienic papers out of contamination risks associated with the cleaning products and other substances that can cause allergic reactions or diseases to individuals using the toilet and towel paper. A right-side storage area is defined by an upper storage area 3i″ and a lower storage area 3i′ divided by a horizontal shelf 3i. These areas can be used to store detergents or cleaning bottles 3r as shown in FIG. 12. A frontal door 3j is provided to enclose and isolate the lower storage portion of said storage section 3 from external environmental conditions. It is important to note that this arrangement provides redundant isolation to the left-side storage area already isolated by door 3p. Storage pockets 3k are provided on an internal wall of said frontal door 3j to maintain important documentation or personal items in a secure, clean and accessible location as shown in FIGS. 11-13. One important feature of the invention is that the frontal door 3j comprises a lock arrangement 3u. In a preferred embodiment, the lock arrangement 3u comprises a combination lock arrangement as shown in FIG. 14, to eliminate the problems associated with the loss or misplacement of traditional keys associated with key locks.

It is a very common problem in traditional cleaning carts to have cleaning dusters exposed and spreading collected dust everywhere. However, the cleaning cart of the present invention comprises storage pockets 5 for storing the duster's fibers and at the same time collecting any dust spreading as a result of movement. These storage pockets 5 are selectively positioned on the bottom part of the sides of the cleaning cart 1 as shown in FIGS. 15 and 16. In a preferred embodiment, a storage pocket 5 comprises a curved opening 6 to accommodate cleaning dusters 9 with protrusions. In addition, a storage pocket 8 is provided to accommodate brooms, dusters and visual indicating equipment 10 as will be explained later.

Figure 20:
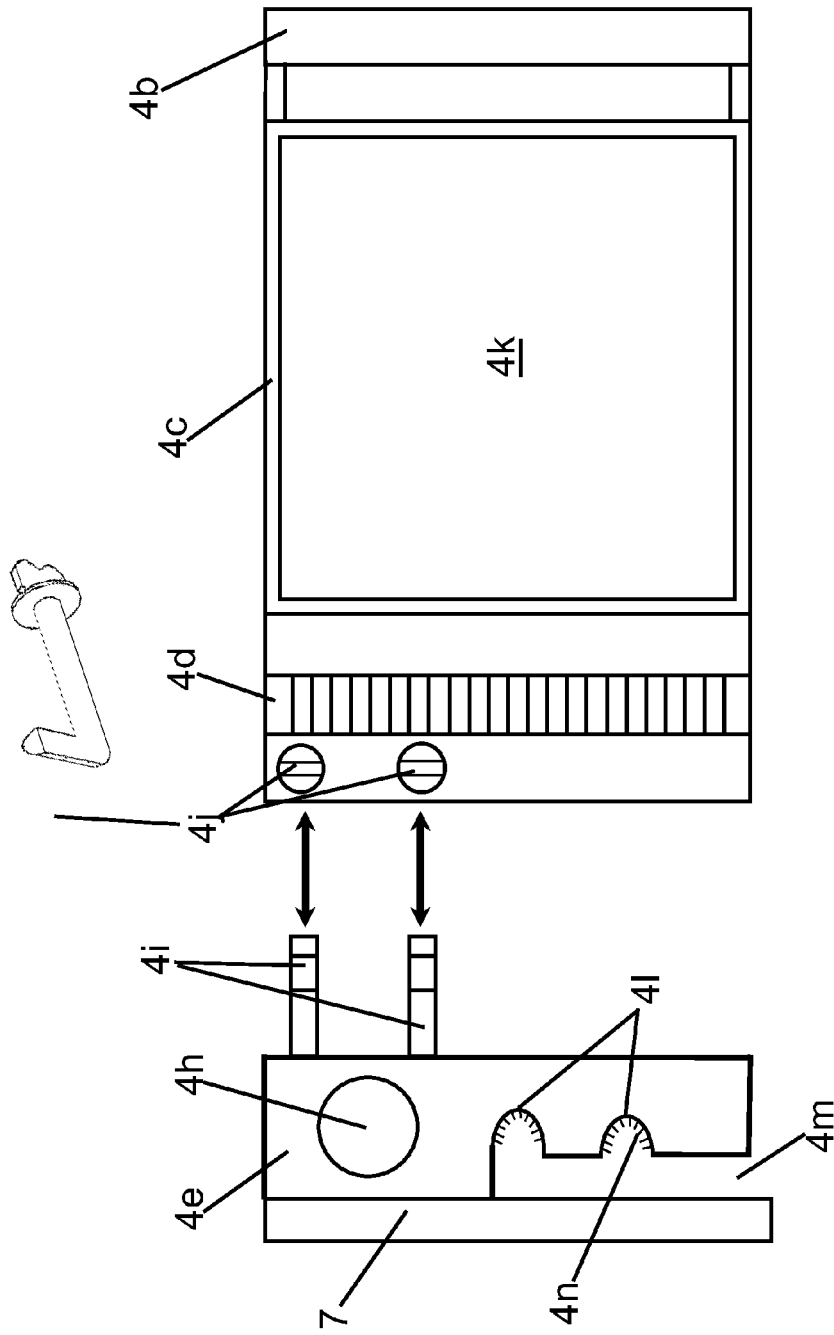
FIG. 20 shows a top view of the quick-release arrangement of FIG. 19 in a released state according to the present invention.
Figure 21:
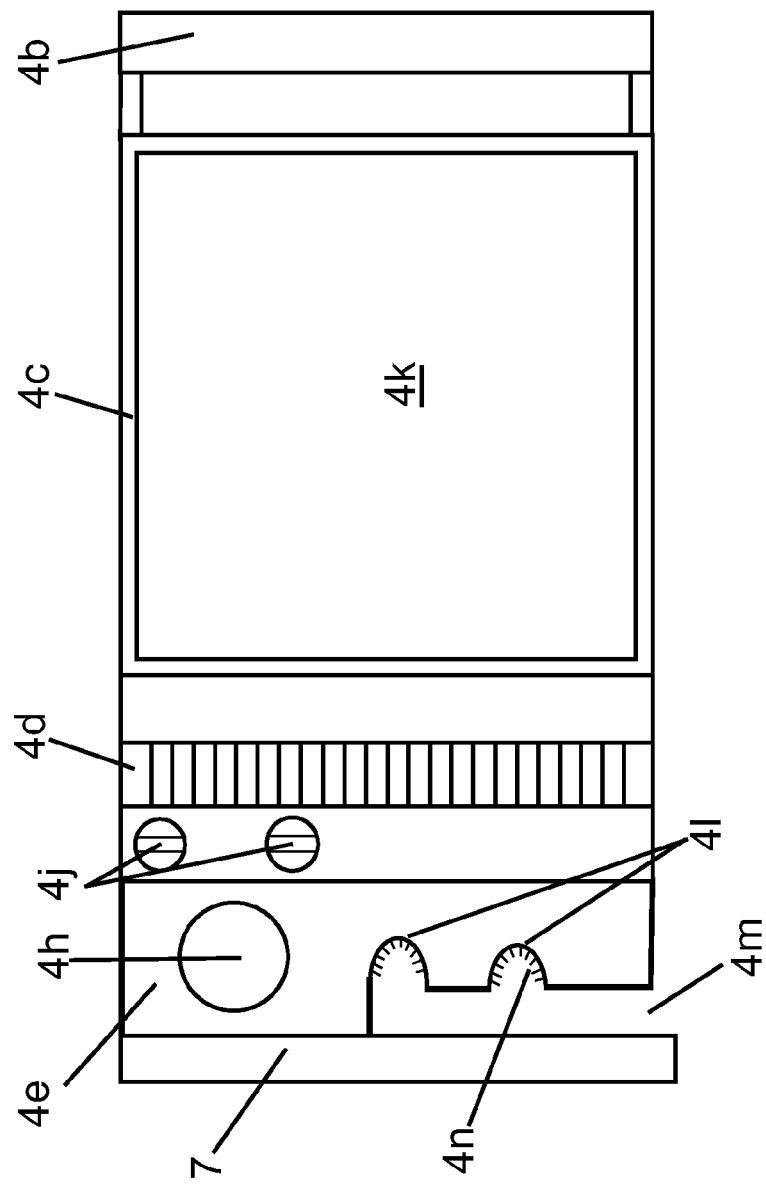
FIG. 21 shows a top view of the quick-release arrangement of FIG. 19 in a latched state according to the present invention.
Figure 23:
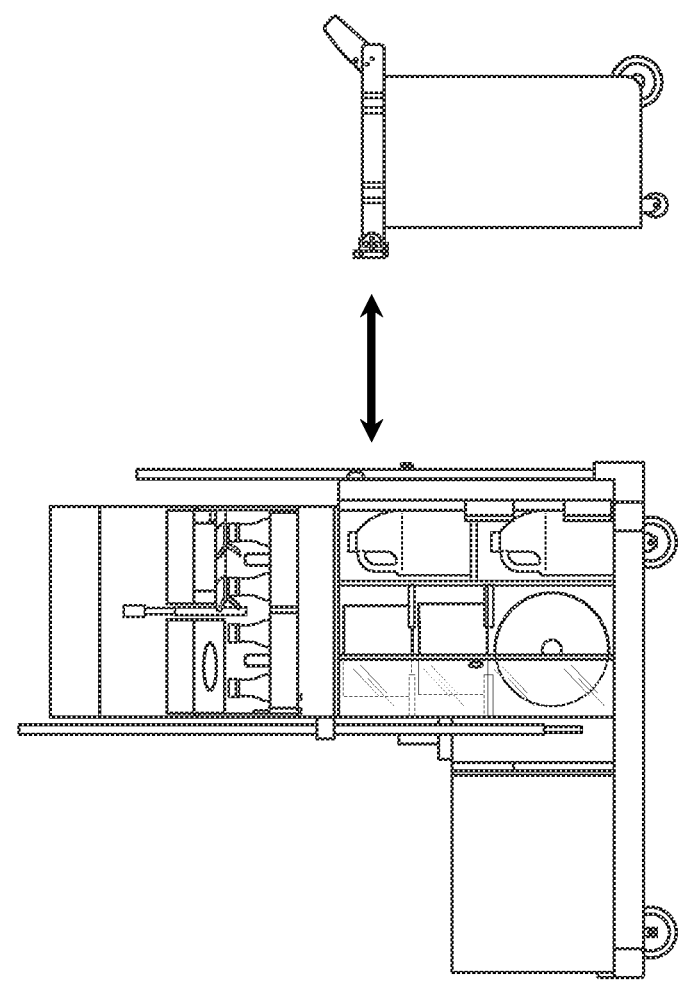
FIG. 23 shows the wheeled container removed from the cleaning cart according to the present invention.

FIGS. 17-21 illustrate a trash collecting section 4 having a handle arrangement comprising a handle 4b integrally connected to a trash receiving opening defined by side elements 4c. Waste bag 4f is removably attached to said handle arrangement. In one embodiment, the Waste bag 4f has openings for receiving engaging hooks 4h in order to removably maintain the waste bag 4f in place as shown in FIG. 19. In another embodiment of the invention, two separate waste bags 4f are provided, one to collect regular trash and the other to collect recycling material as shown in FIG. 18. As will be explained later in detail, the handle arrangement is removably attached to the cleaning cart 1. Specifically, an engaging portion 4d of the handle arrangement is configured to engage in a mating relationship to another engaging portion 4e attached to the cleaning cart. A pair of engaging elements 4i is provided on the engaging portion 4e attached to the cleaning cart configured to be inserted into a pair of receiving openings (not shown) on the engaging portion 4d of the handle arrangement. A pair of L-shaped twist-and-lock elements 4j is selectively actuated to latch against both engaging elements 4i and maintain the handle arrangement secured to the cleaning cart 1. As best seen in FIGS. 20 and 21, the handle arrangement can be removably secured to the cleaning cart 1 by inserting/removing the engaging elements 4i inside openings (not shown) structurally connected to the L-shaped twist-and-lock elements 4j. Thus, the present invention provides a removable waste container that can be easily separated from the rest of the cleaning cart as illustrated in FIG. 23. If a custodian needs to collect a bunch of grouped trash outside the facility, the container is quickly released from the cart and used as an individual wheeled waste container.

The engaging portion 4e comprises a receiving area 4h configured to receive and hold a bottle such as but not limited to: bottle of water, can of soda, or a cleaning solution bottle. Another important feature of the invention is defined by stick retaining elements 4l as shown in FIGS. 17 and 21. The engaging portion 4e comprises a pair of stick retaining elements 4l having a semi-circular shape for accommodating within a stick such as but not limited to: a broom stick and a mop stick as best shown in FIGS. 17 and 18. The engaging portion 4e is provided with an open portion 4m to facilitate insertion and removal of said sticks. In addition, each stick retaining elements 4l has a gripping means 4n configured to latch the sticks against said engaging portion 4e when inserted into the stick retaining elements 4l. In a preferred embodiment, the gripping means 4n comprises a plurality of fibers positioned along the periphery of an inner surface of said stick retaining elements 4l. These fibers are spaced and made of a material for providing suitable friction against said sticks.

Figure 22:
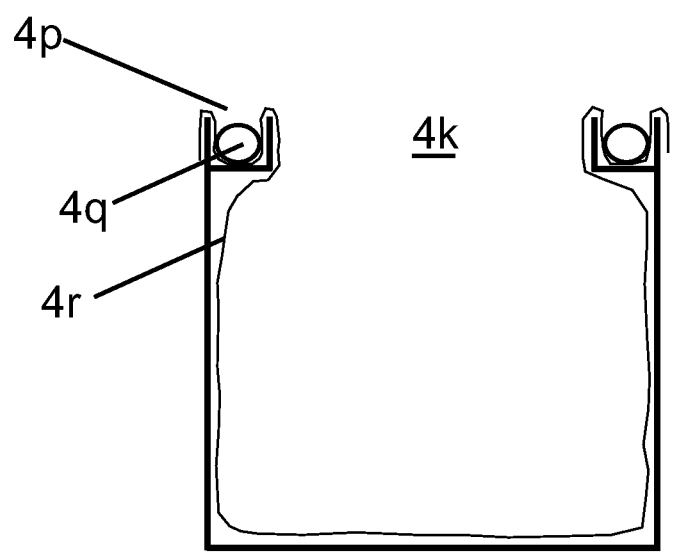
FIG. 22 shows a cross-sectional view of the trash bag and a liner being secured to the trash bag with a fitting element according to the present invention.

The engaging portion 4e also comprises a hinged element 4o configured to allow said handle arrangement to move from a horizontal plane to a vertical plane substantially perpendicular to a side wall of said cleaning cart 1. This feature facilitates the storage of said cleaning cart 1 once the waste bags 4f are removed from the engaging hooks 4h. The handle arrangement further comprises a lid 4g configured to enclose the top of waste bags 4f as defined by opening 4k. Moreover, the side elements 4c have an inner continuous space 4p on their upper portion as shown in FIG. 19. This space receives within a continuous fitting element 4q having a shape similar to the inner continuous space 4p. In operation, a plastic liner 4r is accommodated inside said wasted bag 4f allowing the upper ends of said liner 4r to go over the inner continuous space 4p and an exterior upper portion of said waste bag 4f as illustrated in FIG. 22. Then, the fitting element 4q is inserted inside the inner continuous space 4p to push a portion of said plastic liner 4r against an inner cavity of said continuous space 4p. In a preferred embodiment, fitting element 4q is a metal squared-shaped rod that fits the plastic liner into the waste bag avoiding the use of oversized plastic liners.

Figure 24:
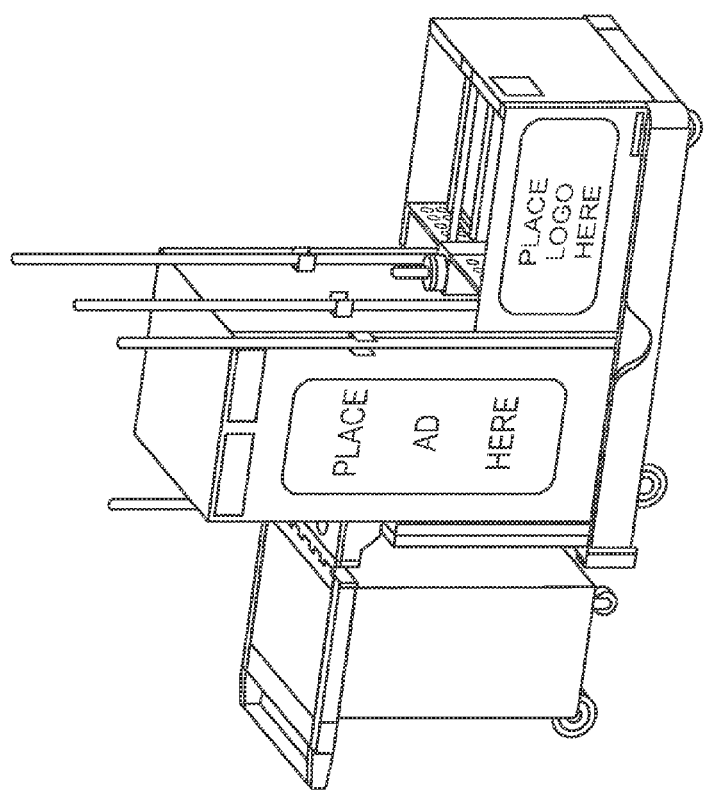
FIG. 24 shows the cleaning cart having visual advertising areas according to the present invention.

FIG. 24 shows the cleaning cart 1 of the present invention in a preferred embodiment. A plurality of visual advertisement labels is attached to the sidewalls of the cart. This provides not only an additional income-generation opportunity but allows the owner of the cleaning cart to provide a clean and consistent corporate image by using its company logo.

Because many varying and differing embodiments maybe made within the scope of the inventive concept herein taught and because many modifications may be made in the embodiment herein detailed in accordance with the descriptive requirement of the law, it is to be understood that the details herein are to be interpreted as illustrative and not in a limiting sense.

I claim:

1. A cleaning cart comprising:
  a mop carrying section including: a first mop receiving area for receiving a first mop; and
  a second mop receiving area for receiving a second mop separate from said first mop receiving area, wherein said first mop receiving area is positioned adjacent to said second mop receiving area and a dividing element is provided between said first mop receiving area and said second mop receiving area, each of said first mop receiving area and said second mop receiving area enclose at least a portion of the mop's cleaning fibers and at least one side of said first and second mop receiving area is provided with a plurality of pass-through openings allowing the flow of air.

2. The cleaning cart of claim 1, wherein said mop carrying section further comprises:
  a first latching element removably engaging a stick of said first mop and a second latching element removably engaging a stick of said second mop, wherein said first and second latching elements prevent the mops from falling outside the cleaning cart.

3. The cleaning cart of claim 1, further comprising: a storage section.

4. The cleaning cart of claim 1, further comprising: a trash collection section.

5. The cleaning cart of claim 1, further comprising at least one outside compartment positioned at a bottom part of said cleaning cart and configured to hide and prevent movement of at least one of: a cleaning broom fibers and a cleaning duster fibers.

6. The cleaning cart of claim 1, further comprising an advertising area configured to receive visual indicia.

7. The cleaning cart of claim 1, further comprising: a stick holding section positioned against a wall surface of said cleaning cart and having at least one stick receiving element.

8. The cleaning cart of claim 7, wherein said stick holding section comprises an access opening defined by said wall surface and a side surface of said stick holding section allowing removal of a stick.

9. The cleaning cart of claim 7, wherein said stick receiving element comprises a gripping element preventing movement of said stick.

10. The cleaning cart of claim 7, wherein said stick holding section further comprises at least one cavity defined to receive at least one of: a bottle, a container and a can.

11. A cleaning cart comprising:
  a mop carrying section including: a first mop receiving area for receiving a first mop; and a second mop receiving area for receiving a second mop separate from said first mop receiving area, wherein said first mop receiving area is positioned adjacent to said second mop receiving area and a dividing element is provided between said first mop receiving area and said second mop receiving area, said dividing element is configured to removably receive a toilet brush container.

12. The cleaning cart of claim 11, wherein said toilet brush container comprises a removable lid having a toilet brush element extending away from a lower side of said removable lid; and sanitizing fluid contained inside said container, said toilet brush bristles being covered by said sanitizing fluid when said removable lid closes said toilet brush container with a sealing arrangement.

13. The cleaning cart of claim 11, wherein said mop carrying section further comprises:
  a first latching element removably engaging a stick of said first mop and a second latching element removably engaging a stick of said second mop, wherein said first and second latching elements prevent the mops from falling outside the cleaning cart.

14. The cleaning cart of claim 11, further comprising: a storage section.

15. The cleaning cart of claim 11, further comprising: a trash collection section.

16. The cleaning cart of claim 11, further comprising at least one outside compartment positioned at a bottom part of said cleaning cart and configured to hide and prevent movement of at least one of: a cleaning broom fibers and a cleaning duster fibers.

17. The cleaning cart of claim 11, further comprising an advertising area configured to receive visual indicia.

18. The cleaning cart of claim 11, further comprising: a stick holding section positioned against a wall surface of said cleaning cart and having at least one stick receiving element.

19. The cleaning cart of claim 18, wherein said stick holding section comprises an access opening defined by said wall surface and a side surface of said stick holding section allowing removal of a stick.

20. The cleaning cart of claim 18, wherein said stick receiving element comprises a gripping element preventing movement of said stick.

21. The cleaning cart of claim 18, wherein said stick holding section further comprises at least one cavity defined to receive at least one of: a bottle, a container and a can.

22. A cleaning cart comprising:
  a mop carrying section including: a first mop receiving area for receiving a first mop;
  a second mop receiving area for receiving a second mop separate from said first mop receiving area, wherein said first mop receiving area is positioned adjacent to said second mop receiving area and a dividing element is provided between said first mop receiving area and said second mop receiving area;
  at least one of: visual indicia to indicate that the first mop is to be positioned inside said first mop receiving area and to indicate that the second mop is to be positioned inside said second mop receiving area; and
  visual indicia individually attached to said first mop and said second mop to indicate that the first mop is to be used to mop a first area and to indicate that said second mop is to be used to mop a second area different from said first area.

23. The cleaning cart of claim 22, wherein said mop carrying section further comprises:
  a first latching element removably engaging a stick of said first mop and a second latching element removably engaging a stick of said second mop, wherein said first and second latching elements prevent the mops from falling outside the cleaning cart.

24. The cleaning cart of claim 22, further comprising: a storage section.

25. The cleaning cart of claim 22, further comprising: a trash collection section.

26. The cleaning cart of claim 22, further comprising at least one outside compartment positioned at a bottom part of said cleaning cart and configured to hide and prevent movement of at least one of: a cleaning broom fibers and a cleaning duster fibers.

27. The cleaning cart of claim 22, further comprising an advertising area configured to receive visual indicia.

28. The cleaning cart of claim 22, further comprising: a stick holding section positioned against a wall surface of said cleaning cart and having at least one stick receiving element.

29. The cleaning cart of claim 28, wherein said stick holding section comprises an access opening defined by said wall surface and a side surface of said stick holding section allowing removal of a stick.

30. The cleaning cart of claim 28, wherein said stick receiving element comprises a gripping element preventing movement of said stick.

31. The cleaning cart of claim 28, wherein said stick holding section further comprises at least one cavity defined to receive at least one of: a bottle, a container and a can.

32. A cleaning cart comprising:
a mop carrying section including: a first mop receiving area for receiving a first mop;
a second mop receiving area for receiving a second mop separate from said first mop receiving area, wherein said first mop receiving area is positioned adjacent to said second mop receiving area and a dividing element is provided between said first mop receiving area and said second mop receiving area;
a mopping cart receiving area for receiving a portable mopping cart; and
a detent element engaging a portion of said portable mopping cart to prevent said portable mopping cart from moving, said portion of said portable mopping cart comprises at least one wheel and said detent element comprises a base positioned in a floor portion of said mopping cart receiving area and having at least one wheel receiving portion receiving said at least one wheel.

33. The cleaning cart of claim 32, wherein said mop carrying section further comprises:
a first latching element removably engaging a stick of said first mop and a second latching element removably engaging a stick of said second mop, wherein said first and second latching elements prevent the mops from falling outside the cleaning cart.

34. The cleaning cart of claim 32, further comprising: a storage section.

35. The cleaning cart of claim 32, further comprising: a trash collection section.

36. The cleaning cart of claim 32, further comprising at least one outside compartment positioned at a bottom part of said cleaning cart and configured to hide and prevent movement of at least one of: a cleaning broom fibers and a cleaning duster fibers.

37. The cleaning cart of claim 32, further comprising an advertising area configured to receive visual indicia.

38. The cleaning cart of claim 32, further comprising: a stick holding section positioned against a wall surface of said cleaning cart and having at least one stick receiving element.

39. The cleaning cart of claim 38, wherein said stick holding section comprises an access opening defined by said wall surface and a side surface of said stick holding section allowing removal of a stick.

40. The cleaning cart of claim 38, wherein said stick receiving element comprises a gripping element preventing movement of said stick.

41. The cleaning cart of claim 38, wherein said stick holding section further comprises at least one cavity defined to receive at least one of: a bottle, a container and a can.

42. A cleaning cart comprising:
a mop carrying section including: a first mop receiving area for receiving a first mop;
a second mop receiving area for receiving a second mop separate from said first mop receiving area, wherein said first mop receiving area is positioned adjacent to said second mop receiving area and a dividing element is provided between said first mop receiving area and said second mop receiving area;
a mopping cart receiving area for receiving a portable mopping cart; and
a detent element engaging a portion of said portable mopping cart to prevent said portable mopping cart from moving, wherein said portable mopping cart comprises two individual mopping areas divided by a vertical wall.

43. A cleaning cart comprising:
a mop carrying section including: a first mop receiving area for receiving a first mop;
a second mop receiving area for receiving a second mop separate from said first mop receiving area, wherein said first mop receiving area is positioned adjacent to said second mop receiving area and a dividing element is provided between said first mop receiving area and said second mop receiving area;
a mopping cart receiving area for receiving a portable mopping cart; and
a detent element engaging a portion of said portable mopping cart to prevent said portable mopping cart from moving, wherein said mopping cart receiving area comprises a holding element removably receiving at least one mopping wringer.

44. A cleaning cart comprising:
a mop carrying section including: a first mop receiving area for receiving a first mop;
a second mop receiving area for receiving a second mop separate from said first mop receiving area, wherein said first mop receiving area is positioned adjacent to said second mop receiving area and a dividing element is provided between said first mop receiving area and said second mop receiving area; and
a door.

45. The cleaning cart of claim 44, wherein said mop carrying section further comprises:
a first latching element removably engaging a stick of said first mop and a second latching element removably engaging a stick of said second mop, wherein said first and second latching elements prevent the mops from falling outside the cleaning cart.

46. The cleaning cart of claim 44, further comprising: a storage section.

47. The cleaning cart of claim 44, further comprising: a trash collection section.

48. The cleaning cart of claim 44, further comprising at least one outside compartment positioned at a bottom part of said cleaning cart and configured to hide and prevent movement of at least one of: a cleaning broom fibers and a cleaning duster fibers.

49. The cleaning cart of claim 44, further comprising an advertising area configured to receive visual indicia.

50. The cleaning cart of claim 44, further comprising: a stick holding section positioned against a wall surface of said cleaning cart and having at least one stick receiving element.

51. The cleaning cart of claim 50, wherein said stick holding section comprises an access opening defined by said wall surface and a side surface of said stick holding section allowing removal of a stick.

52. The cleaning cart of claim 50, wherein said stick receiving element comprises a gripping element preventing movement of said stick.

53. The cleaning cart of claim 50, wherein said stick holding section further comprises at least one cavity defined to receive at least one of: a bottle, a container and a can.

54. A cleaning cart comprising:
a trash collecting section comprising a removable handle having a first side engaging element configured to mate a second side engaging element provided in said cleaning cart, wherein said removable handle further comprises a removable trash collecting cart, wherein at least a portion of said removable handle defines an opening of said removable trash collecting cart.

55. The cleaning cart of claim 54, wherein said trash collection section further comprises at least one quick-release element maintaining said removable handle attached to said cleaning cart.

56. The cleaning cart of claim 54, wherein said removable handle is configured to be folded in relation to said cleaning cart.

57. The cleaning cart of claim 54, wherein said removable handle further comprises a lid to cover said opening defined by said at least a portion of said removable handle.

58. The cleaning cart of claim 54, wherein said removable handle comprises: a continuous cavity provided along the periphery of said removable handle, wherein a portion of a trash bag is positioned over said continuous cavity and a removable bag fitting element on top of said trash bag is pressed against sad trash bag and inserted inside said continuous cavity to keep said trash bag in place.

59. The cleaning cart of claim 54, wherein said removable trash collecting cart comprises: at least two separate liners positioned side by side, wherein each liner has at least one pass-through opening allowing insertion of a liner retaining element positioned on said removable handle.

60. The cleaning cart of claim 54, further comprising: a storage section.

61. The cleaning cart of claim 54, further comprising: a trash collection section.

62. The cleaning cart of claim 54, further comprising at least one outside compartment positioned at a bottom part of said cleaning cart and configured to hide and prevent movement of at least one of: a cleaning broom fibers and a cleaning duster fibers.

63. The cleaning cart of claim 54, further comprising an advertising area configured to receive visual indicia.

64. The cleaning cart of claim 54, further comprising: a stick holding section positioned against a wall surface of said cleaning cart and having at least one stick receiving element.

65. The cleaning cart of claim 64, wherein said stick holding section comprises an access opening defined by said wall surface and a side surface of said stick holding section allowing removal of a stick.

66. The cleaning cart of claim 64, wherein said stick receiving element comprises a gripping element preventing movement of said stick.

67. The cleaning cart of claim 64, wherein said stick holding section further comprises at least one cavity defined to receive at least one of: a bottle, a container and a can.

68. A cleaning cart comprising:
a storage section comprising an upper storage portion and a separate lower storage portion, wherein said upper storage portion comprises: a storage area defined by a fixed left wall, a fixed right wall, a fixed back wall, a fixed bottom wall, a movable top door configured to allow access to said storage area from the top when opened and a movable front door configured to allow access to said storage area from the front when opened, wherein said movable front door is further configured to achieve a substantially horizontal position when opened to serve as a desk.

69. The cleaning cart of claim 68, wherein said movable top door comprises at least one of: a sterile glove dispenser storage compartment and a cleaning wipe dispenser storage compartment; being attached to an inner wall surface of said movable top door.

70. The cleaning cart of claim 68, further comprising a trash bag storage compartment and a liner storage compartment separate from said trash bag storage compartment, both being positioned inside said storage area.

71. The cleaning cart of claim 68 further comprising a towel hanger attached to at least one of: said fixed left wall, said fixed right wall and said fixed back wall.

72. The cleaning cart of claim 68, further comprising one of: an automatic opening element or a semi-automatic opening element configured to open said movable top door.

73. The cleaning cart of claim 68, further comprising a first movable support carrier suitable for carrying cleaning products used to clean a first area and a separate second movable support carrier suitable for carrying cleaning products used to clean a second area different from said first area; both movable support carriers being positioned inside said storage area.

74. The cleaning cart of claim 68, further comprising: a storage section.

75. The cleaning cart of claim 68, further comprising: a trash collection section.

76. The cleaning cart of claim 68, further comprising at least one outside compartment positioned at a bottom part of said cleaning cart and configured to hide and prevent movement of at least one of: a cleaning broom fibers and a cleaning duster fibers.

77. The cleaning cart of claim 68, further comprising an advertising area configured to receive visual indicia.

78. The cleaning cart of claim 68, further comprising: a stick holding section positioned against a wall surface of said cleaning cart and having at least one stick receiving element.

79. The cleaning cart of claim 78, wherein said stick holding section comprises an access opening defined by said wall surface and a side surface of said stick holding section allowing removal of a stick.

80. The cleaning cart of claim 78, wherein said stick receiving element comprises a gripping element preventing movement of said stick.

81. The cleaning cart of claim 78, wherein said stick holding section further comprises at least one cavity defined to receive at least one of: a bottle, a container and a can.

82. A cleaning cart comprising:
a storage section comprising an upper storage portion and a separate lower storage portion, wherein said lower storage portion comprises: a first lower storage area defined by a first fixed right wall, a first fixed back wall, a first fixed left wall, a first fixed top wall, a first fixed bottom wall and a movable front door; and a second lower storage area defined by a second fixed right wall, a second fixed back wall, a second fixed left wall, a second fixed top wall, a second fixed bottom wall and a front opening.

83. The cleaning cart of claim 82, wherein said first lower storage area comprises at least one pair of reciprocating shelves, a first reciprocating shelf being positioned on said first fixed left wall and a second reciprocating shelf being positioned on said first fixed right wall at substantially the same position and the same angle with respect to said walls.

84. The cleaning cart of claim 82, wherein said first lower storage area comprises an insertion rod perpendicularly extending from an inner surface of said first fixed back wall and extending at an angle with respect to said first fixed back wall.

85. The cleaning cart of claim 84, wherein at least one of: the position of said insertion rod and the dimensions of said first lower storage area is selected based at least on the dimension of a toilet paper roll being inserted into said insertion rod.

86. The cleaning cart of claim 82, wherein said second lower storage area comprises an upper part and a lower part divided by a middle shelf attached to said second fixed right wall and said second fixed left wall.

87. The cleaning cart of claim 82, wherein said lower storage portion further comprises a main front door controlling access to said first lower storage area and said second lower storage area.

88. The cleaning cart of claim 87, wherein said main front door comprises at least one of: a key lock and a keyless lock.

89. The cleaning cart of claim 82, further comprising: a storage section.

90. The cleaning cart of claim 82, further comprising: a trash collection section.

91. The cleaning cart of claim 82, further comprising at least one outside compartment positioned at a bottom part of said cleaning cart and configured to hide and prevent movement of at least one of: a cleaning broom fibers and a cleaning duster fibers.

92. The cleaning cart of claim 82, further comprising an advertising area configured to receive visual indicia.

93. The cleaning cart of claim 82, further comprising: a stick holding section positioned against a wall surface of said cleaning cart and having at least one stick receiving element.

94. The cleaning cart of claim 93, wherein said stick holding section comprises an access opening defined by said wall surface and a side surface of said stick holding section allowing removal of a stick.

95. The cleaning cart of claim 93, wherein said stick receiving element comprises a gripping element preventing movement of said stick.

96. The cleaning cart of claim 93, wherein said stick holding section further comprises at least one cavity defined to receive at least one of: a bottle, a container and a can.

* * * * *